Feb. 17, 1953 J. U. LEHN ET AL 2,628,448
CHOKER TRAP
Filed June 15, 1951

INVENTOR.
JOHN U. LEHN
CLEAON M. WEIDMAN, SR.
BY
Robert E. Burns
ATTORNEY

Patented Feb. 17, 1953

2,628,448

UNITED STATES PATENT OFFICE 2,628,448

CHOKER TRAP

John U. Lehn and Cleaon M. Weidman, Sr., Lititz, Pa., assignors to Animal Trap Company of America, Lititz, Pa., a corporation of Pennsylvania Application June 15, 1951, Serial No. 231,748

8 Claims. (Cl. 43—85)

1

This invention relates to animal traps and is more particularly concerned with an animal trap having a spring actuated choker member.

A type of animal trap used for catching mice, rats and like small animals in the home and in commercial and industrial establishments comprises a hollow base having an aperture for receiving the head of the animal and a spring actuated choker, which is generally in the form of a U-shaped wire, disposed adjacent the aperture. The bait is placed inwardly of the choker member and is secured in such manner that movement of the bait by the animal in eating it, or attempting to eat it, will release the spring means actuating the choker member and cause it to strangle the animal. For a trap of this type to be successful, it is obvious that the choker release mechanism should be actuatable by movement of the bait holding means by the animal. Thus, it is desirable that the release mechanism be actuated by even slight movement of the bait holding means and by movement in any direction. Attempts heretofore made to meet these criteria, however, have resulted in the provision of a complicated precision mechanism which is relatively expensive to manufacture and assemble. It is also advantageous to provide means for automatically setting the trap without unduly increasing the manufacturing cost. In the manufacture of traps for mice and rats, it is not only important that they be effective for their intended use but it is also essential that the construction be as free as possible from complicated and intricate elements and that the traps be adapted to be manufactured and assembled inexpensively since this type of trap must be salable at retail at a low price. Complicated structures, therefore, no matter how effective, are not satisfactory from a practical standpoint for traps of this type since they unduly increase the cost of manufacture.

It is the principal object of this invention to provide a trap of the character indicated having choker release mechanism effective to actuate the choker upon slight movement of the bait by the animal but relatively simple in construction and inexpensive to manufacture.

It is another object of the invention to provide a trap of the choker type having automatic setting means which is effective but does not unduly complicate the structure of the trap.

According to the invention, we provide a choker type trap suitable for catching mice, rats and like small animals comprising an apertured hollow base, a spring actuated choker having a choker loop depending in the base, an automatic setting mechanism slidable into engagement with the choker to hold it in set position and means for releasing the choker, said choker release means including a pivoted catch engageable with the choker locking bar when the trap is set and a universally movable weighted bait holder positioned to move the pivoted catch out of engagement with the locking bar, whereby to release the choker, upon slight movement by the animal in any direction within a 360° angle. It is a feature of the invention that the working parts are of simple, readily-assembled construction, yet are highly sensitive in operation and provide an effective trap which is economical to manufacture.

Other objects, features and advantages of the invention will be readily apparent from the following detailed description thereof and from the drawing wherein, Fig. 1 is a plan view of a trap embodying features of the invention, showing the trap in set position;

Fig. 2 is an end elevation of the trap shown in Fig. 1, as viewed from the left;

Fig. 3 is a vertical sectional view, partly in elevation, taken approximately along the line 3—3 of Fig. 1 and showing the relationship of the various interacting parts of the trap;

Fig. 4 is a similar view of the trap showing the position of the coacting parts as the bait holding means is moved and the release mechanism actuated;

Fig. 5 is a similar view showing the relationship of parts when the trap is in a sprung position; and Fig. 6 is a transverse sectional view as taken approximately along the line 6—6 of Fig. 1 but showing a slightly modified form of base.

Referring to the drawing, and particularly to Figs. 1 to 3, the numeral 10 designates the base upon which the operative parts of the trap are mounted and which is suitably formed from plastic, e. g. a molded phenol formaldehyde resin, or metal but which may be suitably formed from other material if desired. The base 10 has a top surface 12, a curved rear surface 14 and a tapered forward surface 16. The base 10 is hollow and is provided with a rib 17 which has an aperture 18 extending through it to the surface 12. Surface 12 is formed with two spaced apertures 20 at its rearward end and has a longitudinal slot 22 extending forwardly from its rear wall 14. Centrally of surface 12 there is provided an aperture 24 having a peripheral ledge 24a, the purpose of which will be readily apparent as the description proceeds.

Mounted upon the base 10 is the spring-actuated choker carrying mechanism or bow formed from a single wire which is bent and coiled to provide two spring coils 25, forwardly extending arms 26 and an integral cross bar 28 extending between the forward ends of the arms 26. The two ends 29 of the wire extend into aperture 18 and are held in place by engagement with the wall of rib 17. A slight depression 30 in surface 12 is provided to seat the spring coils 25. The choker loop 32 has arms 34 which extend through the apertures 20 and are secured to the forward ends of arms 26 as shown in Fig. 1. The choker loop is positioned in the base 10 inwardly of a relatively large aperture 35 formed in the rear wall 14 of base 10 and adapted for the reception of the head of the animal.

The trap is automatically placed in set position with the choker loop 32 lowered into base 10 as shown in Fig. 2 by means of a locking bar 40 which engages cross bar 28 which cooperates with a pivoted latching member. Locking bar 40 is formed from a strip of thin, flat material and has a higher rear portion 45 formed with a downwardly and forwardly extending cam surface 46 at the lower end of which is provided a locking recess 48. The upper wall 49 of the locking recess 48 preferably is made straight and substantially parallel with the surface 12 of the base 10, although the angle of the wall 49 may be inclined to a slight degree either above or below a line parallel with the base, depending upon the desired sensitivity of the tripping action of the trap. The forward wall of the recess 48 is formed with a downwardly and rearwardly extending cam surface 50 and extends upwardly to the top of a projection 52. Mounting and guiding means for the locking bar 40 are provided to permit it to slide forwardly and rearwardly. For this purpose the downwardly extending portion 54 of the locking bar 40 lying beneath the recess 48 is formed with a longitudinal slot 55, the rear end of which is provided with a slight depression 56 for receiving a staple 58 which extends through apertures 60 in base 10 and is secured in position by having its ends bent around a raised surface 62 formed on the underside of base top 12. Depression 56 is positioned rearwardly of the recess 48 so that upward pressure on the upper wall 49 of recess 48 will urge the locking bar 40 to pivot rearwardly, i. e. in a counter-clockwise direction as viewed in Fig. 3. As will be apparent from Figs. 3 to 5, the portion 54 of the locking bar 40 below the slot 55 extends into the longitudinal slot 22 formed in the base 10. The arrangement of parts is such that the locking bar 40 is adapted to pivot freely about staple 58 and to slide forwardly or rearwardly with respect to the staple 58.

The forward end of the locking bar 40 is formed with a forwardly extending pointed projection 65 which has a substantially horizontal top bearing surface 66. The projection 65 of the locking bar 40 is adapted to be engaged by a pivoted latch member 68. Latch member 68 is of substantially L-shaped cross-section, having a normally vertical portion 69 and a horizontal portion 70, and is pivotally mounted about a staple 72 secured in base 10. The vertical portion 69 of latch member 68 is formed with an aperture 74 to define a detent surface 75 for engagement with the top bearing surface 66 of projection 65 to hold the locking bar 40 against upward pivotal movement. The horizontal portion 70 of latch member 68 is formed with an inwardly extending recess 77 coinciding with longitudinal slot 22 in base 10 but has an otherwise continuous surface. Integral ears 78 are provided to form a transverse groove for reception of the staple 72.

Release of the locking bar 40 to permit the trap to be sprung is effected, as will be apparent from the drawing, by pivoting the vertical portion 69 of latch member 68. For this purpose, there is provided a weighted combination bait holder and latch releasing member 80 having a weighted lower portion 82 provided with a bait receiving passage 84 and having a tapered head portion 85 which is seated on the ledge 24a of aperture 24 in base 10. The top of the head portion 85 is flat and underlies the horizontal portion 70 of latch member 68. As will be apparent from the drawing, the head portion is universally pivoted along the periphery of the aperture 24 and thus may be swung in any direction to engage the latch member 68. The latch releasing member 80 is suitably formed from metal or other relatively heavy material so that it will normally hang vertically in the trap. Movement of the lower end 82 by the animal will, as shown in Fig. 4, cause the head 85 to pivot in aperture 24 and lift the horizontal portion 70 of latch member 68, thereby moving the detent 75 out of engagement with the locking bar 40. It will also be apparent that movement of the latch releasing member 80 in any direction will have the same effect so that springing of the trap will occur no matter how the bait holder is moved by the animal. As shown in Fig. 6, the aperture 24 may have an inverted frusto-conical cross-section if desired to permit universal pivotal movement of latch releasing member 80.

When the trap is in the unset or sprung position, the moving parts will be in the position shown in Fig. 5. To set the trap it is merely necessary to press the arms 26 of the choker-carrying member downwardly until the cross bar 28 engages the rearward cam surface 46. As the cross bar 28 is pressed against rearward cam surface 46, a cam action takes place which slides the locking bar 40 rearwardly, the staple 58 acting as a guide for longitudinal slot 55. However, in the event the locking bar 40 has slipped rearwardly, the cross bar 28 will not engage the cam surface 46 but instead will engage the forward cam surface 50, thus moving the locking bar 40 forwardly. When the locking bar 40 moves far enough for the cross bar 28 to clear the forward end of cam surface 46, the cross bar slips into the locking recess 48 and further pressure causes the cross bar 28 to contact the cam surface 50 which causes a cam action in the opposite direction, or forwardly, thereby moving the locking bar 40 forwardly until the upper wall 49 of the locking recess 48 is over the cross bar and the forward projection 65 of the locking bar extends under the detent 75 of the latching member 68. Upon the release of pressure on the choker carrying member, the cross bar 28 will move upwardly against the upper wall 49 of the locking recess 48 and tend to rotate the locking bar 40 in a rearward direction, i. e. counter-clockwise as seen in Fig. 3, whereupon the bearing surface 66 of projection 65 will engage the detent 75 of the latching member 68 thereby restricting further turning of the locking bar and securing the cross bar 28 in the locking recess 48. The trap is now in set position with the choker loop 32 extending downwardly inside the base 10 is front of the aperture 35 so that when the animal inserts his head through the aperture 35 he will also insert it in the choker loop 32. The trap is baited before being set by inserting the bait, which may be cheese, bacon or any similar animal-attracting food, in the passage 84 in the lower end of the combination bait holder and latch releasing member 80.

When the animal eats or attempts to eat the bait held in member 80, he will cause the member 80 to pivot in some direction, generally forwardly or rearwardly. In any case, regardless of the direction of movement, pivoting of the member 80 will cause the head 85 to be raised above the plane of the base surface 12, thereby lifting the horizontal portion of the latching member 68. Upward movement of the horizontal portion 70 will cause the rearward movement of the vertical portion 69, by reason of the pivoting movement of the latching member 68 about staple 72. This will move the detent surface 75 out of engagement with the bearing surface 66 of projection 65 of the locking bar 40 and the locking bar 40 will then rotate rearwardly about pivot 58 by reason of the spring urged action of cross bar 28 against the surface 49 of the locking recess 48. This movement of the locking bar 40 causes the surface 49 to assume a slight upward pitch at its forward end and permits the cross bar 28 to clear the forward end of the cam surface 46 and slip out of the locking recess, thereby moving the choker loop 32 upwardly.

It will be noted that the setting of the trap takes place entirely automatically, merely by pressing downwardly the choker loop supporting member into the locking recess 48, the cam surfaces functioning to place the locking bar in the proper position.

As previously mentioned, the trap of the invention is characterized by ease of manufacture and assembly. To assemble the trap, the locking bar 40 is slipped into the longitudinal slot 22 at about a 45° angle and then brought up horizontally into position, the staple having slipped into the slot 55. With the forward end of the locking bar held up, bait holding member 80 is then slipped into the aperture 24. The vertical portion 69 of the latching member 68 is then slipped under the staple 72. The choker loop supporting member or bow is then placed in position, the ends 29 being inserted in the aperture 18, the ends of the choker loop 32 are extended upwardly through the apertures 20 and secured in position on the arms 26. The assembly is then complete and it will be apparent that this assembly of preformed parts may be effected rapidly and easily.

We thus provide an improved trap of the choker type which is economical to manufacture and easy to assemble, yet has features of operation which are highly desirable in types of this trap, viz. an effective automatic setting mechanism and a sensitive release mechanism which is actuated regardless of the direction in which the animal moves the bait holding member.

It will be obvious to those skilled in the art that various changes and modifications may be made in the embodiment which we have selected for illustration of our invention without departing from the scope of the invention as defined in the appended claims, and it is intended, therefore, that all matter contained in the foregoing description and in the drawing shall be interpreted as illustrative and not in a limiting sense.

What we claim and desire to secure by Letters Patent is:

1. A trap of the character indicated comprising, in combination, a hollow base, a spring-urged choker member disposed for pivotal movement in said base, a locking bar for holding said choker member in set position, a pivoted latching member having a detent surface engageable with one end of the locking bar, and means for pivoting said latching member out of engagement with the locking bar, said means being adapted to pivot said latching member upon movement in any direction within a 360° angle whereby to release the spring-urged choker member.

2. A trap of the character indicated comprising, in combination, a hollow base, a spring-urged choker member disposed for pivotal movement in said base, a locking bar for holding said choker member in set position, a pivoted latching member having a detent surface engageable with one end of the locking bar, and means for pivoting said latching member out of engagement with the locking bar, whereby to release the spring-urged choker member, said means comprising a freely pivotable depending member having a head underlying the latching member, said depending member being adapted to pivot said latching member upon movement in any direction within a 360° angle.

3. A trap of the character indicated comprising, in comination, a hollow base, a spring-urged choker member disposed for pivotal movement in said base, a locking bar for holding said choker member in set position, a pivoted L-shaped latching member having a detent surface engageable with one end of the locking bar, and means for pivoting said latching member out of engagement with the locking bar, whereby to release the spring-urged choker member, said means comprising a freely pivotable depending member having a head underlying the latching member.

4. A trap of the character indicated comprising, in combination, a hollow base, a spring-urged choker member disposed for pivotal movement in said base, a locking bar for holding said choker member in set position, a pivoted latching member having a detent surface engageable with one end of the locking bar, and means for pivoting said latching member out of engagement with the locking bar, whereby to release the spring-urged choker member, said means comprising a freely pivotable weighted depending member having a head underlying the latching member and having a bait receiving aperture in its lower end, said depending member being adapted to pivot said latching member upon movement in any direction within a 360° angle.

5. A trap of the character indicated comprising, in combination, a hollow base, a spring-urged choker member disposed for pivotal movement in said base, a locking bar for holding said choker member in set position, a pivoted L-shaped latching member having a detent surface engageable with one end of the locking bar, and means for pivoting said latching member out of engagement with the locking bar, whereby to release the spring-urged choker member, said means comprising a freely pivotable weighted depending member having a head underlying the latching member and having a bait receiving aperture in its lower end.

6. A trap of the character indicated comprising, in combination, a hollow base having an aperture formed with a peripheral ledge, a spring-urged choker member disposed for pivotal movement in said base, a locking bar for holding said choker member in set position, a pivoted latching member having a portion overlying said aperture and having a detent surface engageable with one end of the locking bar, and means for pivoting said latching member out of engagement with the locking bar, whereby to release the spring-urged choker member, said means comprising a freely pivotable member depending in said aperture and having a head underlying said latching member portion and engaged against the peripheral ledge of said aperture.

7. A trap of the character indicated comprising, in combination, a hollow base having an aperture formed with a peripheral ledge, a spring-urged choker member disposed for pivotal movement in said base, a locking bar for holding said choker member in set position, a pivoted L-shaped latching member having a portion overlying said aperture and having a detent surface engageable with one end of the locking bar, and means for pivoting said latching member out of engagement with the locking bar, whereby to release the spring-urged choker member, said means comprising a freely pivotable member depending in said aperture and having a head underlying said latching member portion and engaged against the peripheral ledge of said aperture.

8. A trap of the character indicated comprising, in combination, a hollow base having an aperture formed with a peripheral ledge, a spring-urged choker member disposed for pivotal movement in said base, a locking bar for holding said choker member in set position, a pivoted latching member having a portion overlying said aperture and having a detent surface engageable with one end of the locking bar, and means for pivoting said latching member out of engagement with the locking bar, whereby to release the spring-urged choker member, said means comprising a freely pivotable member depending in said aperture and having a head underlying said latching member portion and engaged against the peripheral ledge of said aperture and having a bait receiving aperture in its lower end.

JOHN U. LEHN.
CLEAON M. WEIDMAN, Sr.

REFERENCES CITED

The following references are of record in the file of this patent:

UNITED STATES PATENTS

| Number | Name | Date |
|---|---|---|
| 1,951,296 | Kleffman | Mar. 13, 1934 |
| 2,233,628 | Meik et al. | Mar. 4, 1941 |
| 2,247,652 | Dougherty | July 1, 1941 |